Figure 1:
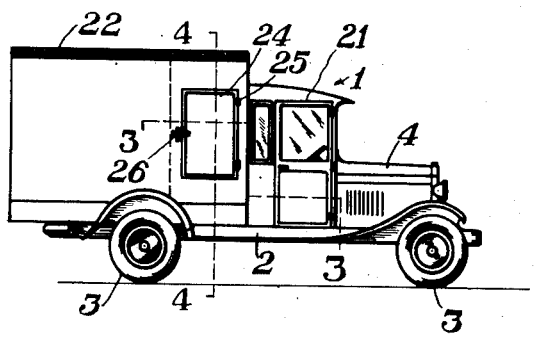

Aug. 30, 1932.  W. H. SARTAIN  1,874,364
REFRIGERATING APPARATUS
Filed April 23, 1930   2 Sheets-Sheet 1

Inventor
William H. Sartain
By W. S. McDowell
Attorney

Aug. 30, 1932.  W. H. SARTAIN  1,874,364
REFRIGERATING APPARATUS
Filed April 23, 1930  2 Sheets-Sheet 2

Inventor
William H. Sartain
By W. P. McDowell
Attorney

Patented Aug. 30, 1932

1,874,364

UNITED STATES PATENT OFFICE

WILLIAM H. SARTAIN, OF COLUMBUS, OHIO

REFRIGERATING APPARATUS

Application filed April 23, 1930. Serial No. 446,684.

This invention relates to improvements in refrigerating apparatus and has specific reference to apparatus adapted to be embodied in the construction of a vehicle, such as a motor vehicle, railroad car or other movable carrier, whereby food stuffs, particularly meats and perishable commodities, may be maintained at a temperature prohibiting spoilage or deterioration during the transportation of such commodities from place to place.

It is another object of the invention to provide an improved refrigerating body especially designed for use in connection with automotive vehicles and wherein the body is formed to include a low-temperature compartment maintained at a desired operating temperature through the provision of novel and improved refrigerating mechanism, and wherein the mechanism is operated by power taken from the operating engine of the vehicle.

It is a further object of the invention to so construct the refrigerating apparatus that when the vehicle upon which it is mounted stops the refrigerating action is continued to the end of maintaining the said compartment at a desired temperature irrespective of the normal starting and stopping operations of said vehicle or the operating engine thereof.

Another object resides in the provision of a refrigerated vehicle body wherein both the top and bottom of the body are provided with liquid refrigerant receiving tanks and wherein pump mechanism is utilized for the purpose of effecting forced circulation of the refrigerant from the lower to the upper tanks, the upper of said tanks being provided with depending spray nozzles having their outlet ends disposed in substantially J-shaped conduits, whereby when the liquid refrigerant is sprayed into the upper portions of said conduits the warmer air within the top of the refrigerated compartment is drawn into said conduits and brought into intimate contact with the sprayed refrigerant, the refrigerant being withdrawn from the bottom of said compartment and returned to the lower of said tanks for recirculation while the cooled or chilled air escapes from the lower portion of the said conduits and is returned to the refrigerated compartment.

Other objects reside in forming the tank in the upper part of the refrigerated compartment to possess a refrigerant holding capacity sufficient to maintain the operation of the refrigerating apparatus constant for a period of time after active operation of the associated pumping and compressing mechanism has been discontinued; in providing means for driving the pumping and compressing mechanism from a driven part of the vehicle upon which the mechanism is carried; and in other novel features of arrangement, and simplicity of control which will be in part obvious and in part pointed out hereinafter.

Figure 2:
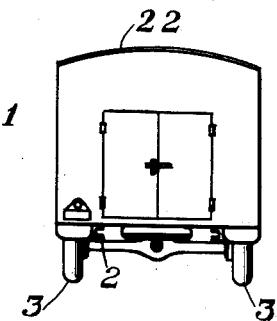
Figure 3:
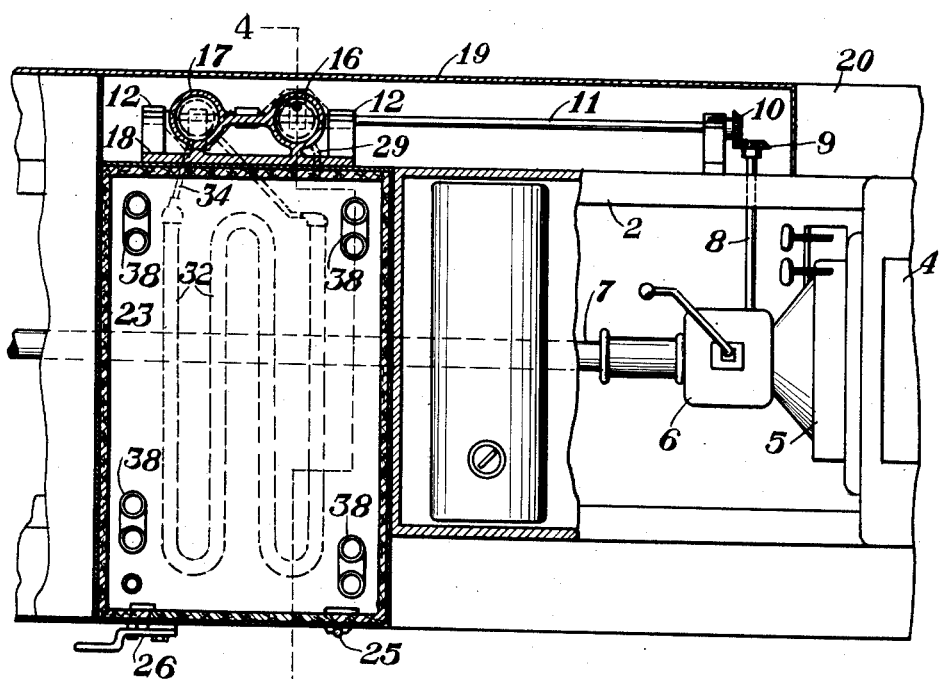
Figure 4:
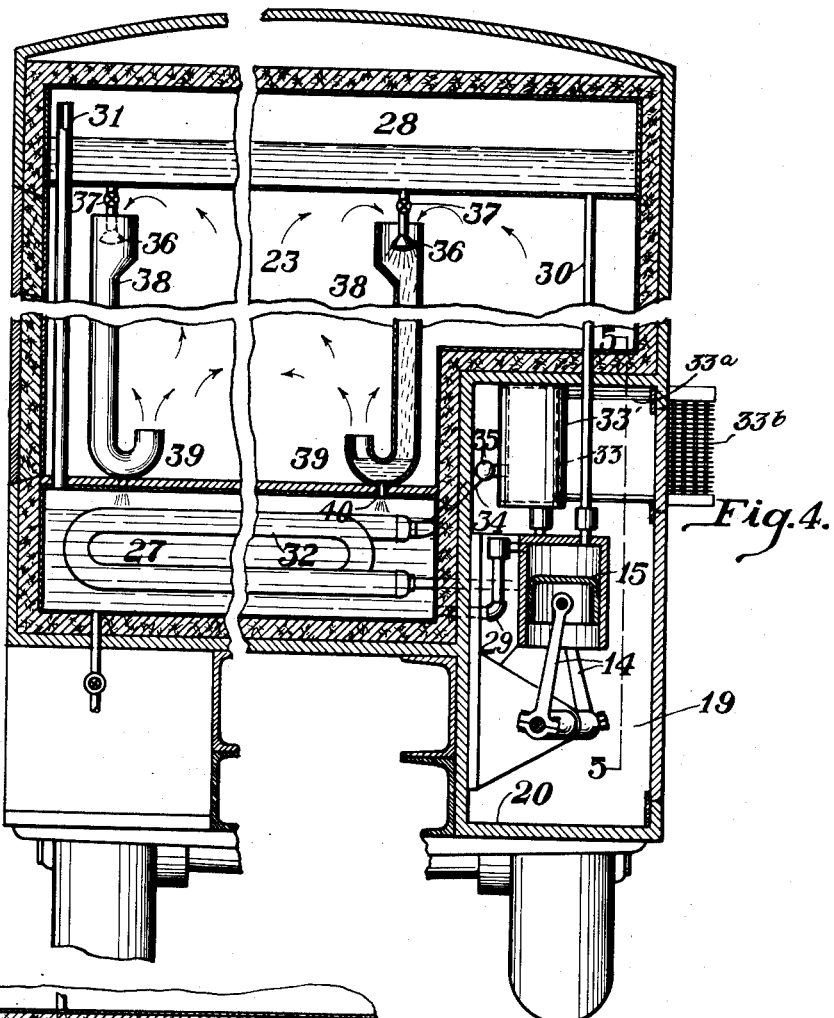
Figure 5:
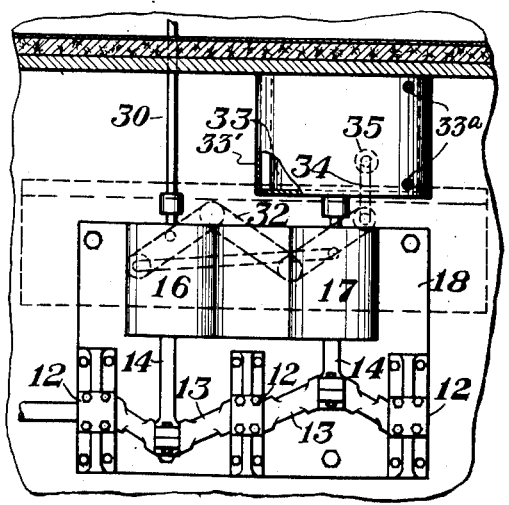

For a further understanding of the invention reference is to be had to the following description and to the accompanying drawings wherein:

Figure 1 is a side elevation of an automotive vehicle provided with a body refrigerated in accordance with the present invention, Figure 2 is an end elevation of the vehicle, Figure 3 is a horizontal sectional view on the plane indicated by the lines 3—3 of Figure 1, Figure 4 is a vertical transverse sectional view taken through the body of the vehicle on the plane indicated by the lines 4—4 of Figures 1 and 3, and Figure 5 is a vertical sectional view on the plane indicated by the line 5—5 of Figure 4.

Referring more particularly to the drawings, an automotive vehicle is designated by the numeral 1. The vehicle is formed to include a frame 2, supporting wheels 3 and a power plant, which in this instance includes the engine 4, clutch 5, transmission 6 and a drive shaft 7 which extends from the transmission to the rear axle assembly of the vehicle. All of these parts are of standard construction and operation, and therefore a more extended explanation has been omitted.

In this instance the gearing (not shown) in the transmission casing 6 drives a short transversely extending shaft 8 which carries at its outer end a gear 9, adapted to engage a similar gear 10 provided upon a longitudinally extending shaft 11. This latter shaft is journaled in connection with bearings 12 suitably secured to the frame 2. The rear end of the shaft 11 is connected with the crank shaft 13 with which are associated connecting arms 14, which have their upper ends connected with sliding pistons 15 found in connection with pumping and compressing cylinders 16 and 17 respectively. These cylinders are mounted in connection with a base member 18 secured to the frame 2 and are arranged within a housing 19 disposed on one of the running boards 20 of the vehicle.

Mounted on the frame 2 to the rear of the vehicle driver's cab 21 is a closed body 22. In this instance the forward end of the body 22 is formed with a refrigerated compartment 23 which is adapted to contain meats or other food products which tend to spoil if maintained for any appreciable time at normal atmospheric temperatures. The walls of the body 22 comprising the compartment 23 may be formed from any suitable heat insulating materials such as are commonly found in connection with refrigerating compartments generally. The rear portion of the body 22 may be adapted for holding articles of food which do not require refrigeration for effecting their preservation. The compartment 23 is rendered accessible by means of one or more hinged doors 24. In this instance the hinged door disclosed is accessible from the side of the vehicle. The door 24 is hinged as at 25 and may be retained in a closed position through the medium of a suitable latch device 26.

Provided in the bottom of the compartment 23 is a refrigerant-containing tank 27 which may contain brine or any other suitable type of a fluid refrigerant. The top of the compartment 23 is provided with a similar tank 28, and a pipe 29 establishes communication between the lower tank 27 and the pumping cylinder 16 whereby through the operation of the piston in this pumping cylinder the brine may be forced through a vertically extending pipe 30 to the upper tank 28. A vertical holder flow-pipe 31 operates to transfer the brine from the upper compartment to the lower compartment after a predetermined level has been reached in the upper tank.

For the purpose of cooling the liquid refrigerant there is arranged in the lower tank 27 an expansion coil 32. Circulation of a refrigerant such as ammonia is maintained in the coil 32 by the provision of the compression cylinder 17. Thus during the operation of the compression unit the ammonia or other refrigerant is reduced to liquid form and forced into a pressure chamber 33 which is inclosed within a water jacket 33 and disposed above the cylinder 17. The water jacket 33' is connected, near the top and bottom, by means of conduits 33a with a radiator 33b of any well known construction located on the exterior of the vehicle body. When the refrigerant is forced into the pressure chamber 38, the heat collected within the expansion coil will be absorbed by the water surrounding the pressure chamber 33. As this water becomes warmer it will rise and pass to the radiator 33b in which it will be cooled and returned to the water jacket to be recirculated therethrough. The chamber is provided with a valved discharge line 34 leading to the coil 32, the said line 34 being provided with a pressure release or expansion valve 35. It will be readily understood that the heat required to vaporize the refrigerant circulating through the coil 32 is extracted from the brine in the tank 27, causing a reduction in the temperature of the brine in said tank which admits of its subsequent use in lowering the temperature of the compartment 23.

The upper compartment is provided with a plurality of downwardly directed nozzles 36 having control valves 37. These nozzles terminate within the upper ends of substantially vertically disposed J-shaped conduits 38, which are arranged vertically in the corners of the compartment 23. The upper ends of the conduits 38 are appreciably larger in diameter than the spray nozzles 36 so that when the brine is being discharged in spray form into the conduits the warmer air in the upper portion of said compartment is drawn into the conduits and thereby comes into intimate contact with the spray brine, heat interchange taking place as a result of this action so that the temperature of the air is appreciably lowered by its direct contact with the spray of liquid. Since the bottoms of the conduits 38 are of U-shaped form, liquid traps 39 are produced by which the brine is collected and then transmitted to the tank 27 by way of the short pipes 40. The cold air, however, is discharged from the bottoms of the conduits as indicated by the arrows a where it is permitted to circulate through the compartment until it attains a higher temperature when it again ascends to the top of the compartment for recirculation through the conduits 38.

In view of the foregoing it will be seen that the present invention provides a refrigerated body of efficient yet simple design adapted for use particularly in connection with automotive vehicles. The invention finds in this connection a great field of use in the handling of meat products particularly. These products are retained during transportation at a desired low temperature and are prevented from deteriorating during such handling. In the operation of vehicles of this type, it is necessary to stop at frequent intervals to make deliveries and for other purposes. By the provision of the upper tank 28 the stopping of the vehicle thus simultaneously arrests the operation of the refrigerating apparatus. It will be observed that the upper tank has a very considerable storage capacity for the brine or other refrigerant so that the vehicle may remain at a standstill for an extended period of time without arresting the flow of the sprayed refrigerant into the cooling conduits 38. Usually the capacity of the upper tank for holding the brine is sufficient for the ordinary intervals of stopping of the vehicle and this factor is of very considerable importance in maintaining the desired constant temperatures within the compartment 23. I, of course, do not limit my invention to its use in connection with automotive vehicles since it is apparent that the principles of the invention are applicable to railroad cars or other carriers utilized in the transportation of commodities requiring low temperatures for their preservation. Other adaptations and modifications of structure will be apparent to those skilled in the art, and I therefore reserve the right to employ all such structures and arrangements which fall within the scope of the following claims.

What is claimed is:

1. A vehicle body formed to include a refrigerated compartment, a refrigerant-containing tank located in the lower part of said compartment, a refrigerant storage tank located in the upper part of the compartment, means for forcing the refrigerant from the lower tank into the upper tank conduits arranged within said compartment between said tanks, means for spraying the refrigerant from the upper tank into the upper portions of said conduits for intimate contact with warm air taken from the upper portion of said compartment, and traps formed with the lower portion of said conduits for returning the liquid refrigerant to the lower of said tanks and permitting of the passage of the cold air into the lower portions of said compartment.

2. A vehicle body provided with a refrigerated compartment, a refrigerant-receiving tank disposed in the region of the lower portion of said compartment, a refrigerant storage similar tank in the region of the upper portion of said compartment, means for passing the refrigerant from the upper of said tanks to the lower tank in contact with the air in said compartment, and positively operating means for passing said refrigerant from the lower of said tanks to the upper tank.

3. In a refrigerated vehicle body having a compartment, a tank arranged in the upper portion of said compartment and adapted to contain a liquid refrigerant, heat interchangers arranged in said compartment and through which said liquid refrigerant is passed, means for cooling the refrigerant following its passage through said heat interchangers, and positively operating means for returning the cooled refrigerant to said tank.

4. In a refrigerated vehicle body, a housing formed to include a compartment, a refrigerant-storage tank located contiguous to the upper portion of said housing, heat interchangers arranged in said compartment below said tank and through which said refrigerant is passed to cool said compartment, means arranged in the bottom of said housing for lowering the temperature of the refrigerant discharged from said heat interchangers, and means for returning the cooled refrigerant to said tank.

5. A vehicle body formed to include a refrigerated compartment, a refrigerant storage container arranged in the upper portion of said body, heat interchanging devices arranged within said compartment and through which the refrigerant from said container is passed and brought into heat interchanging relationship with the air in said compartment, a tank arranged in the lower portion of said body and formed to receive the refrigerant discharged from said heat interchanging device, means arranged in said lower tank to remove heat from said refrigerant, and pump means for returning the cooled refrigerant from said lower tank to said container.

6. A vehicle body provided with a refrigerated compartment, a liquid refrigerant container arranged in the upper portion of said body, a similar container arranged in the lower portion of said body, heat interchanging means arranged in said compartment between said containers and through which the refrigerant from the upper of said containers passes to the lower container, a closed expansion coil situated in said lower container for cooling the liquid refrigerant contained in the latter, a compressor for controlling the flow of a fluid through said coil, and a pump for returning the cooled refrigerant from the lower to the upper container.

7. A vehicle body having a refrigerated compartment, a storage container arranged in the upper portion of said compartment and adapted to contain a liquid refrigerant, heat interchanging devices disposed in said compartment, means for passing the refrigerant through said heat interchanging device from said container, means for cooling the refrigerant discharged from said heat interchanging device, and a pump for returning the cooled refrigerant to said storage container, said storage container being constructed to admit of continued flow of the refrigerant therefrom through said heat interchangers for a substantial period of time independently of the operation of said pump.

8. In an automotive vehicle, the combination with the power plant thereof, of a body having a refrigerated compartment, means driven by said power plant for effecting forced circulation of a liquid refrigerant through said compartment, and means including a storage tank arranged in the upper portion of said body for effecting substantial flow of said refrigerant through said compartment independently of the operation of said power plant.

In testimony whereof I affix my signature.

WILLIAM H. SARTAIN.